No. 775,401. PATENTED NOV. 22, 1904.
E. HEUBACH.
MAP INDEX.
APPLICATION FILED JULY 18, 1904.
NO MODEL.
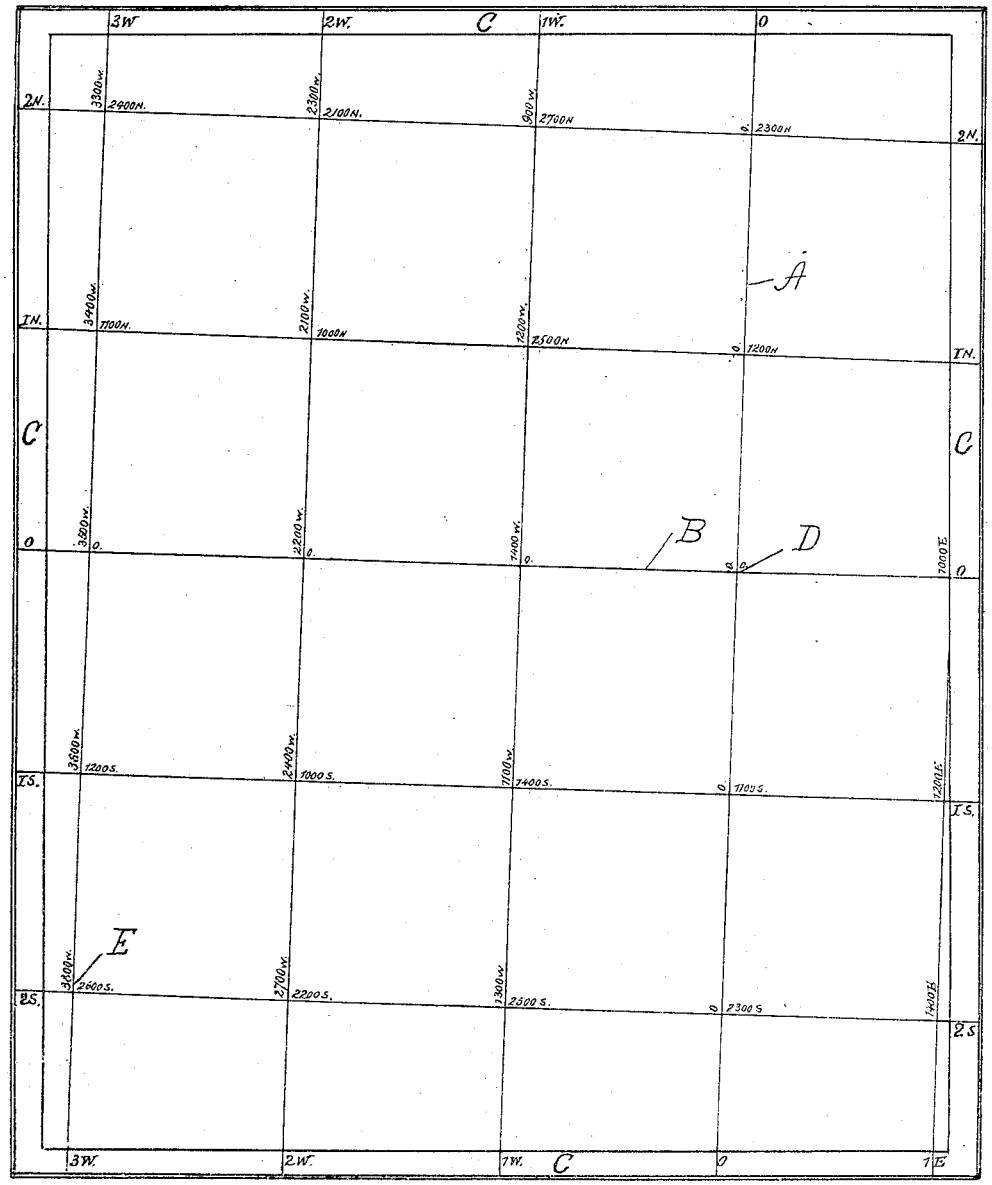
Witnesses:
Robert S. Legg
Ouida Cundiff.
Inventor
Emil Heubach,
By Horace King
Atty.

No. 775,401.

Patented November 22, 1904.

UNITED STATES PATENT OFFICE.

EMIL HEUBACH, OF EDISON PARK, ILLINOIS.

MAP-INDEX.

SPECIFICATION forming part of Letters Patent No. 775,401, dated November 22, 1904.

Application filed July 18, 1904. Serial No. 217,106. (No model.)

*To all whom it may concern:*

Be it known that I, EMIL HEUBACH, a citizen of the United States, residing at Edison Park, Cook county, Illinois, have invented certain new and useful Improvements in Map-Indexes, of which the following, taken in connection with the drawing, is a specification.

My invention has for its object the production of an index to be used in connection with city maps, and is designed more particularly for the purpose of enabling a person to determine distances from one part of the city to another.

My index (shown herein) is intended to be used in connection with my improved map, upon which a patent was granted to me on March 15, 1904, No. 754,450. For the purpose of clearness I have illustrated the index alone—that is, without showing it as applied to a map—in the drawings. It is believed from the following description that the application of the index to the map will be obvious.

In the drawing I have shown a plan view of a portion of an index designed to be used in connection with a city map.

In applying my index to a city map I first locate the north and south and the east and west directrix-lines of a city, which have been established when the city is platted, and these I use as my guide-lines.

In the drawings the north and south directrix is shown at A and the east and west directrix at B. The street-numbers in each direction begin from one or the other of these lines. Measuring from these directrix-lines in each direction I divide the city into sections—for convenience, I will say, of one mile square, although it is obvious that this might be more or less. Upon the outer edge of the map is a margin C. In this margin I indicate at each section-line the number of miles north, south, east, or west. The said section-line is located with reference to the main directrix-lines. At the intersection of each of these lines I place the last number on the street running in either direction as guide-numbers for the street-blocks between these intersections. I also place a letter with the number to indicate what direction it is from the main directrix-lines. By this means a person is enabled to calculate the distance in miles or the fraction of a mile to or from any given point.

In applying my index to a map I do so with ink of a contrasting color from that used on the map, thus enabling one to readily follow the intersecting lines.

In the outer margin of a completed map I arrange an alphabetical list of the streets of the city, (not here shown,) and after the name of each street I place a number and a letter or any symbol to correspond with those used on the map indicating the direction and the number of miles said street is to be located from the intersection of the directrixes, which on the drawing is illustrated at D. These numbers and letters will correspond with the numbers and letters or other symbols which might be used. (Found in the margin C of the drawing.) For instance, if a person desired to find California street he would first turn to the alphabetical list under C and find "California" and note the directions following the street-name, which might be "3w. 2s." This would indicate that California street could be found on the map three miles west and two miles south of the intersection of the directrix-lines shown on the drawing at D. Following the directrix-line B west to the third section-line, then south two section-lines, will locate the street desired at the point E. By noting the numbers at the intersection of the section-lines a person may easily locate any given number within these sections.

What I claim as new, and desire to secure by Letters Patent, is—

1. An index for a city map having as the foundation thereof lines indicating the directrix-lines of a city, section-lines at predetermined distances from said directrix-lines, and marginal references to each of said section-lines indicating the distance of each section-line from the directrix-lines, substantially as described.

2. An index for a city map, having as the foundation thereof lines indicating the directrix-lines of said city, section-lines running parallel with said directrix-lines at predetermined distances therefrom, numbers and letters placed at the intersection of said section-lines to indicate the street-numbers at said intersections and the direction from the directrixes, substantially as described.

3. An index for a city map, having as the foundation thereof lines indicating the directrix-lines of said city, section-lines running parallel with said directrix-lines at predetermined distances therefrom, numbers and letters placed at the intersection of said section-lines to indicate the street-numbers at said intersections and the direction from the directrixes, and marginal references to each of the aforesaid sectional lines indicating the distance and direction of each sectional line from the directrix-lines, substantially as described.

EMIL HEUBACH.

Witnesses:
ROBERT T. CLEGG,
FLORENCE KING.